(12) United States Patent
Gadd

(10) Patent No.: US 6,561,417 B1
(45) Date of Patent: May 13, 2003

(54) STOCK CONTROL COMPUTER SYSTEM AND METHOD

(75) Inventor: Richard John Gadd, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/348,567

(22) Filed: Jul. 7, 1999

(30) Foreign Application Priority Data

Dec. 17, 1998 (GB) .............................................. 9827738

(51) Int. Cl.⁷ .............................................. G06K 15/00
(52) U.S. Cl. ......................... 235/383; 235/385; 705/28
(58) Field of Search ................................ 235/383, 376, 235/385; 705/22, 23, 26, 28

(56) References Cited

U.S. PATENT DOCUMENTS

| | | | |
|---|---|---|---|
| 4,563,739 A | * 1/1986 | Gerpheide et al. | 235/385 |
| 5,047,614 A | 9/1991 | Bianco | 235/385 |
| 5,250,789 A | 10/1993 | Johnsen | 235/383 |
| 5,537,313 A | * 7/1996 | Pirelli | 235/385 |
| 5,611,051 A | * 3/1997 | Pirelli | 395/210 |
| 5,691,684 A | 11/1997 | Murrah | 235/385 |
| 5,712,989 A | * 1/1998 | Johnson et al. | 395/228 |
| 5,806,044 A | * 9/1998 | Powell | 705/14 |
| 5,878,416 A | * 3/1999 | Harris et al. | 707/10 |
| 5,880,449 A | * 3/1999 | Teicher | 235/383 |
| 5,884,300 A | * 3/1999 | Brockman | 707/2 |
| 5,983,202 A | * 11/1999 | Yabe et al. | 705/28 |
| 6,105,004 A | * 8/2000 | Halperin et al. | 235/383 |
| 6,112,857 A | * 9/2000 | Morrison | 235/383 |

FOREIGN PATENT DOCUMENTS

| | | | |
|---|---|---|---|
| JP | 5-094459 A | * | 4/1993 |
| JP | 7-168897 A | * | 7/1995 |
| JP | 10-240318 A | * | 9/1998 |
| JP | 11-203562 A | * | 7/1999 |
| WO | WO 98/18094 | | 4/1998 |

* cited by examiner

*Primary Examiner*—Diane I. Lee
(74) *Attorney, Agent, or Firm*—Louis J. Percello

(57) ABSTRACT

A stock control computer system includes a memory for storing a current stock list based on product codes. An electronic version of a store purchase receipt, including product codes for the items purchased, is sent from the store to the customer's home computer where it is used to update the current stock list by addition of products purchased. Items are deleted from the current stock list as they are disposed of by the customer, in response to an electronic indication of the corresponding product codes produced, for example, by scanning product packaging with a bar code scanner. When the customer initiates a home stock check, the current stock list is compared with a predetermined stock level and an indication of which items need replacement is produced. This indication may be displayed, printed or transmitted electronically to the store. The electronic purchase receipt may also be used to generate and update a correlation between product codes, such as bar codes, and product descriptions, this correlation also being stored in memory.

12 Claims, 3 Drawing Sheets

STOCK CONTROL COMPUTER SYSTEM AND METHOD

BACKGROUND OF THE INVENTION

The invention relates to a computer system, computer program and method for stock control. In particular, but without limitation thereto, the invention relates to stock control, in the home, of everyday household items.

The use of electronics and computing in the field of retail shopping, particularly food shopping, has become widespread in recent years. In addition to the scanning of product bar codes at electronic checkout stations, supermarket chains have introduced facilities for personal hand-held scanners for shoppers to scan articles as they pick them from the shelves and to store a record of the articles to be purchased. When the shopper reaches the checkout, the contents of the shopping trolley can be automatically read into the store's computer system from the scanner, allowing immediate display of a description and price of each article purchased and, after payment, printing of a till (cash register) receipt. In this way, faster progress of customers through the checkouts is facilitated.

Supermarket chains have also made use of the Internet to allow customers with home computers and Internet connection to generate an electronic shopping list (or order) by selection from a displayed catalogue of the supermarket's goods. This list can be sent electronically to the supermarket and the purchases assembled by the supermarket staff for collection or delivery to the customer's home.

Examples of known electronic shopping technology include U.S. Pat. No. 5,047,614 (Bianco) entitled "Method and Apparatus for Computer-Aided Shopping". This patent describes how a shopping list can be generated manually by a customer with a home computer and bar code scanner from (a) preprinted lists, provided by the supermarket, which correlate bar codes and product descriptions, (b) bar codes on discarded items and (c) discount coupons containing bar codes. The list may then be printed, stored on a smart card or read out from the scanner's memory when the customer visits the store.

U.S. Pat. No. 5,250,789 (Johnson) entitled "Shopping Cart" employs a cart mounted shopping system including a scanner, a display and wireless communication with a store computer. A shopping list may be prepared by scanning bar codes from a catalogue or an old cash register tape (till receipt) which includes bar codes. The shopper is then guided around the store in the order in which items on the list are stocked and is advised of promotions as they reach them.

Published International patent application WO 98/18094 (Eldat Communication Limited) entitled "Personal Shopping System" shows a system of great complexity involving in-store transmission of prices to electronic display labels and a hand-held personal shopper device with display and keypad. One aspect of this system is the maintenance and updating of a "customer shopping profile" in a memory of the hand-held device. A "purchase record" containing item names, quantities and numeric codes is built up during shopping and used to facilitate checkout and also as a basis for updating the contents of the profile memory. Before shopping, the customer uses the customer profile and other information, say about discounts, to create a shopping list which is then stored in the shopper device and which interacts with the store's central computer to signal that the customer is near an item on the list by causing a light on a product price display to blink.

All the above are concerned with in-store technology. One patent which is concerned more with the domestic end is U.S. Pat. No. 5,691,684 (Murrah) entitled "Article Storage Container with Bar Code Scanning". This shows a container such as a refrigerator or pantry with dual in-built bar code scanners for sensing insertion or removal of products. The information can be used by an associated home computer system to generate printed inventories or shopping lists on request. The inventory is effectively the list of products placed in the container minus those removed.

SUMMARY OF THE INVENTION

None of the above prior art shows a rapid and convenient way of updating the inventory of products, enabling the rapid generation of a shopping list of items to be replaced.

Accordingly, the present invention provides a stock control computer system including a memory for storing a current stock list based on product codes; updating means responsive to input to said system of an electronic version of a receipt of purchases, including product codes, to add products purchased to said current stock list; deleting means responsive to an electronic indication of the codes of products disposed of to delete those products from the current stock list; comparing means for comparing the current stock list with a predetermined stock level; and indicating means responsive to such comparison for indicating which items of stock need replacing.

The updating means, deleting means, comparing means and indicating means may, according to the invention be provided by a computer progam recorded on a medium.

Viewed from another aspect, the invention also provides a method of stock control employing a computer system having a memory for storing a current stock list based on product codes, said method comprising the steps of: in response to input to said system of an electronic version of a receipt of purchases, adding products purchased to said current stock list; in response to an electronic indication of the codes of products disposed of, deleting products from the current stock list; comparing the current stock list with a predetermined level of stock; and in response to said comparison, indicating which items of stock need replacing.

The use of an electronic version of the purchase receipt by the computer system thus speeds up the updating of inventory in turn enabling a shopping list to be prepared automatically and rapidly without direct customer involvement in selection and manipulation of items. The invention finds particular application in the control of stocks of everyday household items in the home which are likely to be purchased repeatedly from a common supplier, such as a supermarket. However, it may also be implemented in office or small business environments where casual purchases, resulting in purchase receipts, are made to supplement stock.

Preferably, a correlation between product codes and descriptions is generated from electronic till receipts of purchases by the customer and is provided over a communications network by e-mail or by a web application, written onto a smart card or even stored directly in a small hand-held computing device carried by the customer. This correlation is preferably stored in the computer memory and may be used to indicate product descriptions of the items needing replacement, as well as their product codes.

Although it is more convenient to use a correlation list held in the user's computer, and regularly updated, it would be possible instead to use a correlation list provided by the store over a network from the store's own product database.

Depending on the intended use of the indication of items needing replacement, the invention can thus provide either a human readable shopping list of product descriptions for use in person or an electronic list of items which could be transmitted electronically to a remote computer at a product supplier.

It is preferred that the product codes used should be bar codes but any other coding system such as numerical coding could in theory be used. A bar code scanner in the home is the most convenient way of indicating electronically the codes of products being disposed of, either by consumption or by the discarding of out of date items.

If a hand-held device, like a palm-top computer were used, it could incorporate a bar code scanner.

Preferably, the list of products needing replacement would be generated by comparison of the updated inventory or stock list with a predetermined reference list of desired levels of stock. However, the comparison could simply determine whether products were in stock in the home or not, though this would not indicate how many were needed. In this case, the deleting means would not normally delete the product code, when stocks fell to zero but would maintain it in the stock list with an indication that the number held was zero.

BRIEF DESCRIPTION OF THE DRAWINGS

The invention will now be described, by way of example only, with reference to a preferred embodiment thereof, as illustrated in the accompanying drawings, in which.

DETAILED DESCRIPTION OF THE INVENTION

Figure 1:
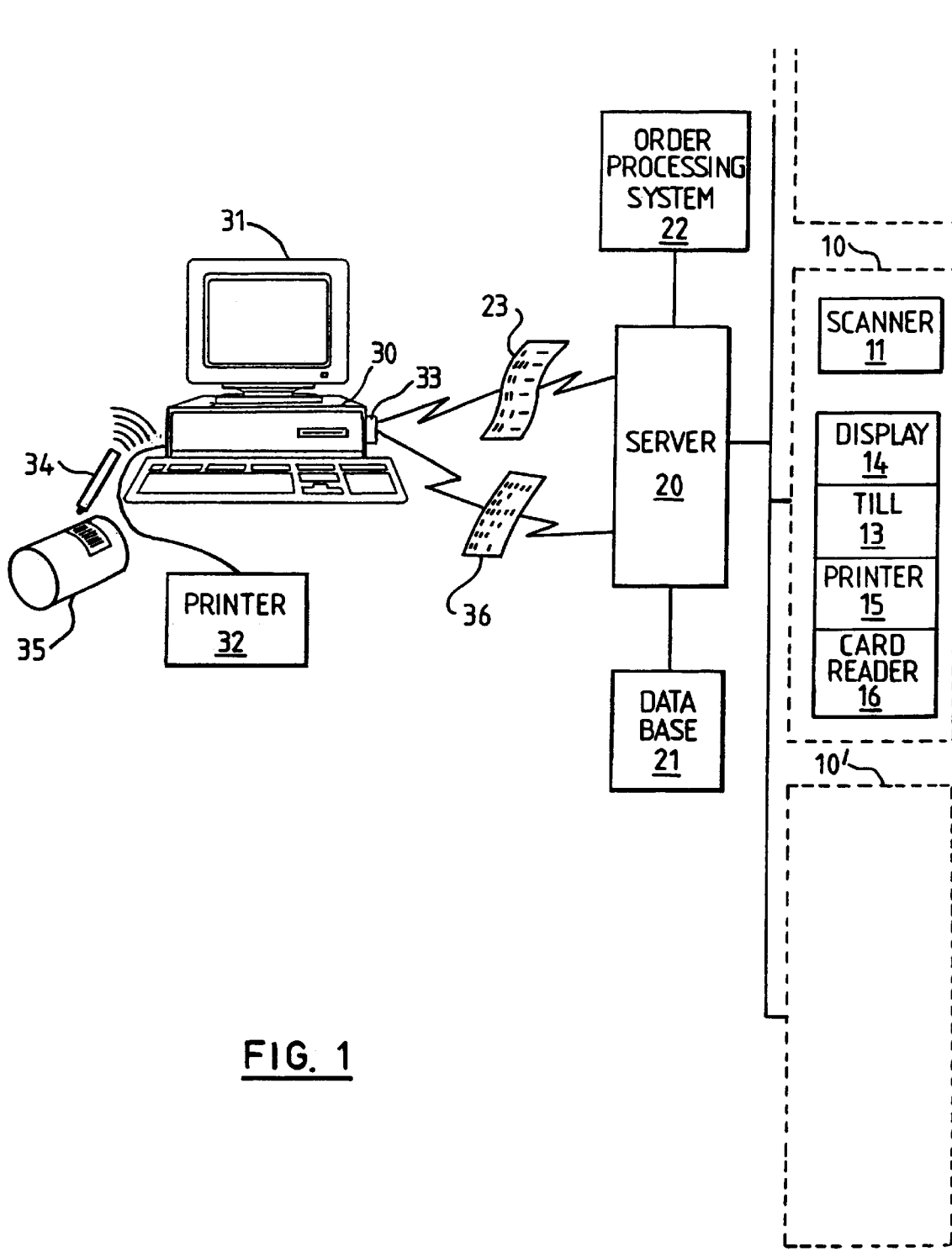
FIG. 1 is a schematic diagram of a stock control computer system according to the invention and of portions of a cooperating store computer system.

In FIG. 1 the basic components of a computerised supermarket checkout system are shown schematically in electronic communication with a home based personal computer system, programmed and adapted for control of the stock of household products, food and the like.

The supermarket system comprises checkout stations 10, 10' etc., each consisting of a scanner 11 and a terminal comprising till 13 (cash register), display 14, printer 15 and card reader 16. The scanner operates by detecting conventional bar codes, printed on purchased items, and passes these to a main server computer 20 which is in communication with a database 21 storing bar codes, prices and product names. Prices and product names corresponding to the bar codes are identified and fed back to the terminal for display to the checkout operator and customer. The server, or possibly, the terminal itself lists all the items purchased and calculates the total price to be paid. Printer 15 prints the till receipt for the customer in conventional manner.

The payment process may involve the reading of a credit card in card reader 16 or may be a cash transaction. In recent years, it is becoming the practice for stores also to ask for and read a customer loyalty card, to be able to credit the customer with discounts or trigger the issue of redeemable coupons. Such customer cards are also used in recently developed self scanning systems to obtain a hand-held scanner with which the customer can scan products as selected, the scanner being read instead of the checkout fixed scanner to speed up the checkout process.

Such loyalty cards, which may be of the magnetic stripe or of the "smart" variety (including semiconductor circuit memory) identify the customer to the server computer which, in this example, also holds the customer's electronic mail address for his or her home computer. The server also holds an electronic version of the till receipt, which, in this example includes not only product name, quantity and price but also the corresponding product bar codes. Either instantaneously or asynchronously, an electronic version 23 of this till receipt is sent to the customer over the Internet.

In the remainder of FIG. 1 is illustrated the customer's home system, including personal computer 30 with hard disk and main memory, a conventional display monitor 31, a printer 32 and a modem 33, allowing connection to the Internet. Also part of the home system of this example is a bar code scanner 34 including an infra-red transmitter for transmitting information to an appropriate input port of computer 30. The scanner may be used to scan codes on product packaging, such as can 35, after the product has been consumed or otherwise discarded, for example, because they are out of date.

The final element of FIG. 1 is a electronic shopping list 36, generated by the home stock control system in a manner to be described and transmitted to the store over the Internet via modem 33. After receipt and initial processing by the server 20, the list with the bar codes suitably translated into product names is passed to an order processing terminal 22 in a warehouse, where the customer's order can be assembled for collection or delivery. Alternatively, if required, a hard copy of the list can be printed by printer 32 and used for shopping in person.

Figure 2:
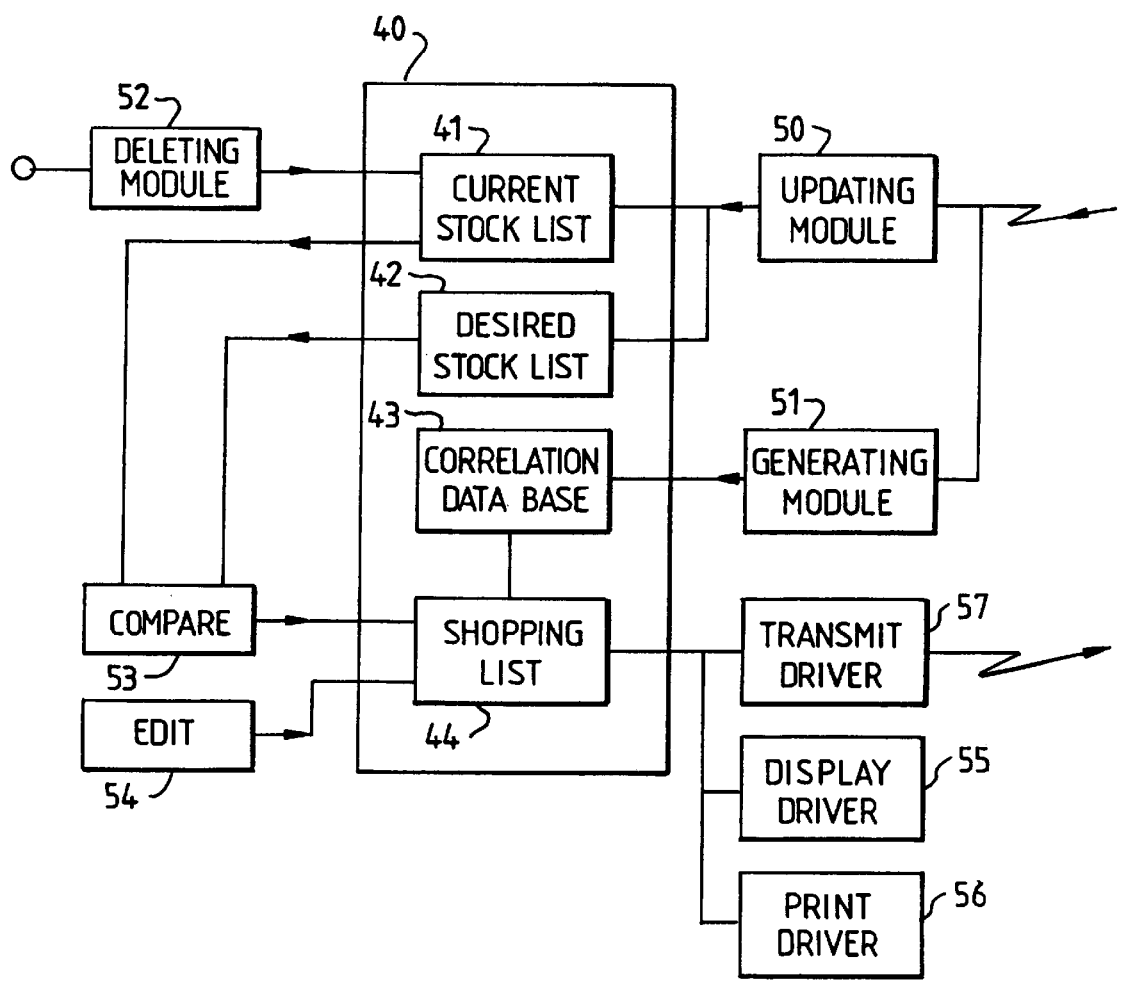
FIG. 2 is a block diagram of internal computer program and memory components of the stock control computer system of FIG. 1.
Figure 3:
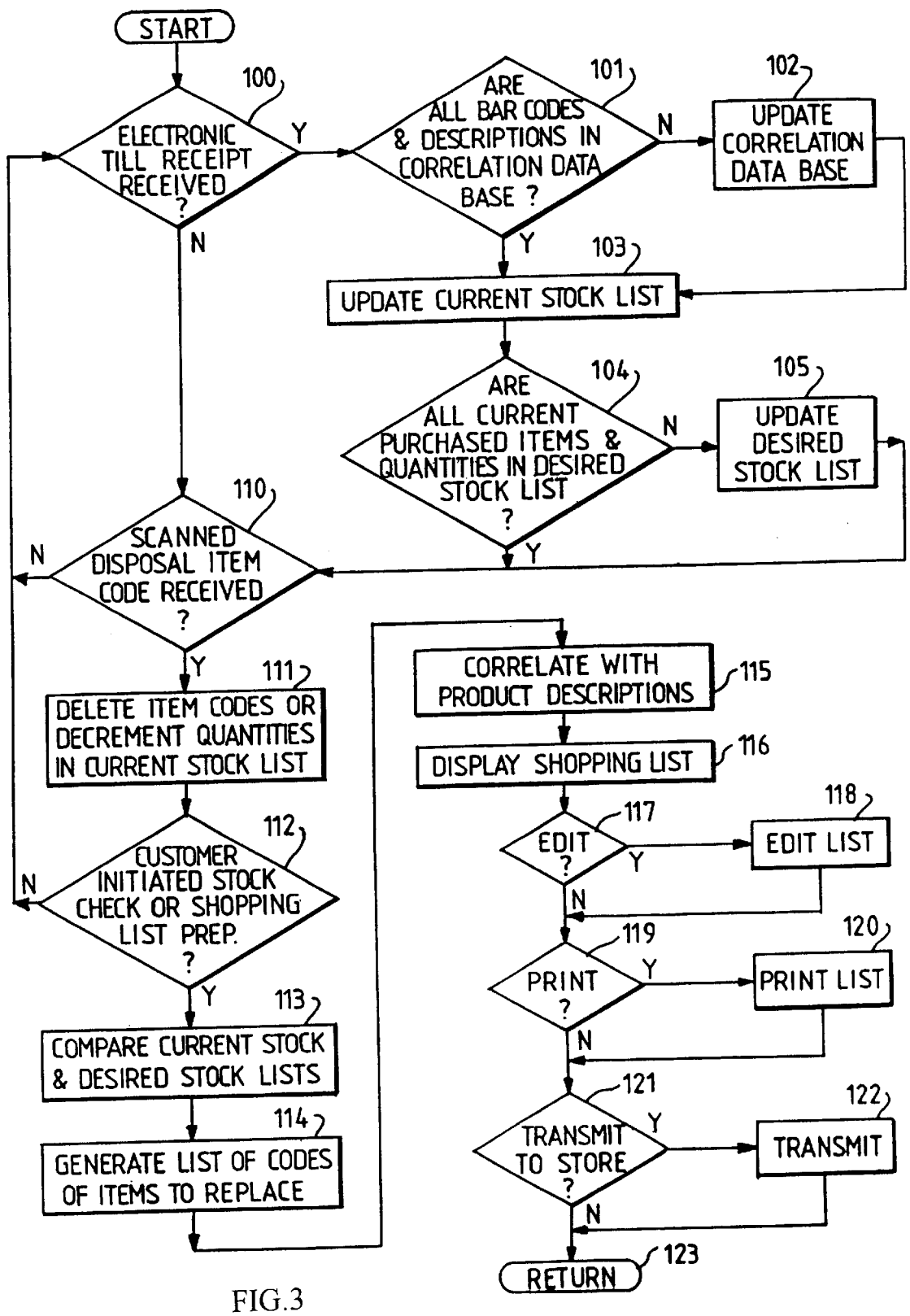
FIG. 3 is a flow diagram illustrating a method of stock control according to the invention, carried out in the system of FIG. 1.

The main elements of one example of a home stock control computer program according to the invention, together with data structures held in the memory of the personal computer 30 are shown in FIG. 2 and the steps of one example of a method of home stock control, as the program is executed are shown in the flow diagram of FIG. 3.

In the memory 40 of the computer 30, which may be disk or semiconductor main storage or any combination of the two, areas of storage are allocated as follows. A current stock list 41 contains bar codes and quantity information corresponding to the current contents of the household. A desired stock list 42 contains similar information indicating the desired quantity of each item. A correlation data base 43 correlates product bar codes and product names or descriptions. Finally, a shopping list 44 is created which contains bar codes, product descriptions and quantities. The electronically transmitted version 36 of the shopping list need not contain the descriptive information as this can be added by server 20 by reference to database 21.

The other software components of the system shown in FIG. 2 are an updating module 50 which receives the electronic till receipt 23 over the Internet and uses the information to update the current stock list and, as necessary, the desired stock list 42. A generating module 51, also uses the information in the electronic till receipt to build and update the correlation data base 43.

Deleting module 52 processes the input from the bar code scanner 34 and deletes from the current stock list any items which have been disposed of. The contents of the current stock list 41 and the desired stock list 42 are compared in module 53 whose output, together with correlation information from data base 43, is used to form the shopping list 44.

The shopping list can be displayed on display 31 and edited using the computer keyboard or a pointing device by means of editing module 54. Display driver 55 and print driver 56 control the display and optional printing of the list. A transmit driver 57, formats and transmits the list over the Internet.

The detailed operation of the system and method will now be described with reference to FIG. 3.

Upon receipt of an electronic till receipt 23 in step 100, the generating module 51 determines in step 101 whether or not all the bar codes and descriptions exist in the correlation database 43. If they do not, the correlation data base is updated in step 102 with any new code/description pairs. It should be noted that bar codes may be reassigned by the store from time to time and so it is necessary to check that each code/description pair is identical to that stored for the same code. The correlation database is generated from scratch in this way and modified if necessary each time a new till receipt is transmitted.

After any necessary update of the correlation database, the current stock list 41 is updated by updating module 50 in step 103 with the bar codes and quantities of new items added to stock according to the electronic till receipt. If the till receipt shows in step 104 that new items, not currently on the desired stock list have been purchased, or existing items have been purchased but in greater quantities, then the desired stock list is updated by module 50 in step 105.

In step 110, the system receives a product code from scanner 34 to indicate that an item of stock has been disposed of. The deleting module 52, in step 111, then removes a corresponding item from the current stock list or reduces the number held in stock by one.

At some point, the customer decides to initiate a stock check with a view to preparation of a new shopping list in step 112. Compare module 53 compares the current and desired stock lists 41 and 42 in step 113 and generates a list of the codes and quantities of items needing replacement in step 114. These codes are correlated with the corresponding product descriptions in step 115 to produce the complete shopping list for display to the customer at step 116.

At this point, the customer may edit the list in steps 117 and 118 using Edit module 54 and the input devices of the personal computer (keyboard and mouse). When satisfied, the customer decides in step 119 whether to print the list at step 120 to keep either as a record or to use for a personal shopping trip to the store.

Whether or not the list is printed, the customer may then choose in step 121 to send the list to the store in step 122 as an advance order for collection or delivery. The program control then returns at step 123 to await either a further till receipt, at step 100, or a bar code scanner input, at step 110.

I claim:

1. A computer system for controlling a stock of products at a customers location comprising:
   a point of sale computer server located at a sales outlet, having a customer interface which allows the inputing of customer identification data, said point of sale computer having a server which provides a product identification function, records data relating to products purchased by said customer, and generates a receipt identifying said purchased products, said point of sale computer having a first communication link having the capability of sending said receipt;
   a customer computer located at said customer location, remote from said point of sale computer and having a second communication link for connecting to said first communication link to receive said receipt; said customer computer further comprising:
   a reader for identifying products as they are used and generating an output relative thereto;
   a memory for storing a current stock list of the contents of customer's stock of products; and a product identification data base; and
   a processor for receiving said receipt, comparing said products purchased to said current list of stock contents and updating said current list; said processor further receiving said output of said reader and updating said current list of stock contents in response thereto.

2. A computer system for controlling a stock of products at a customers location, as described in claim 1, wherein said memory further stores a desired stock list and said processor compares said desired stock list with said current stock list and generates a shopping list.

3. A computer system for controlling a stock of products at a customers location, as described in claim 1, wherein said processor initially obtains the product identification data contained in the product identification data base from said receipt and compares the product identification data in a receipt to said product identification database in said memory and updates said product identification database.

4. A computer system for controlling a stock of products at a customers location, as described in claim 1, wherein said communication links are connected through a network.

5. A computer system for controlling a stock of products at a customers location, as described in claim 4, wherein said network comprises the Internet.

6. A computer system for controlling a stock of products at a customers location, as described in claim 1, wherein the products are identified by reading bar codes presented on each product and said product identification database contains data which correlates the bar codes to product descriptions.

7. In a computer system, a method for controlling a stock of products at a customers location, comprising the steps of:
   at a point of sale computer, generating a receipt containing product identification data of products purchased by said customer, and transmitting said receipt over a communications link;
   receiving said receipt at a customer's computer;
   processing said product identification data of products purchased to generate a current stock list of the contents of customer's stock of products; and to generate a product identification database; and updating said current stock list as receipts are received;
   storing said current stock list and said product identification database in memory;
   reading product identification data as products are removed from said customer's stock of products and updating said current stock list in response thereto.

8. In a computer system, a method for controlling a stock of products at a customers location further, according to claim 7, further comprising the steps of:
   storing a desired stock list in said customer's computer; and
   comparing said desired stock list with said current stock list and generating a shopping list of items to be bought.

9. In a computer system, a method for controlling a stock of products at a customers location, according to claim 7, further comprising the step of comparing the product identification data in a receipt to said product identification database in said memory and updating said product identification database.

10. In a computer system, a method for controlling a stock of products at a customers location, according to claim 7, wherein said receipt is transmitted via a network.

11. In a computer system, a method for controlling a stock of products at a customers location, according to claim 10, wherein said network is the Internet.

12. In a computer system, a method for controlling a stock of products at a customers location, according to claim 7, wherein the products are identified by reading bar codes presented on each product and said product identification database contains data which correlates the bar codes to product descriptions.

* * * * *

Disclaimer

6,561,417—Richard John Gadd, Eastleigh (GB). STOCK CONTROL COMPUTER SYSTEM AND METHOD Patent dated May 13, 2003. Disclaimer filed Oct. 4, 2006, by the assignee, International Business Machines Corporation.

Hereby enters this disclaimer to all claims, of said patent.

*(Official Gazette, January 9, 2007)*